US011426805B2

(12) United States Patent
Coffey et al.

(10) Patent No.: US 11,426,805 B2
(45) Date of Patent: Aug. 30, 2022

(54) SURFACE PRECISION DEFECT SHAVER

(71) Applicant: Lockheed Martin Corporation, Bethesda, MD (US)

(72) Inventors: Kevin Aaron Coffey, Grapevine, TX (US); Stuart C. Street, Aledo, TX (US); Steven E. Twaddle, Aledo, TX (US); William Lynn Jenkins, Burleson, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 202 days.

(21) Appl. No.: 15/930,664

(22) Filed: May 13, 2020

(65) Prior Publication Data

US 2021/0354213 A1 Nov. 18, 2021

(51) Int. Cl.
*B23C 1/20* (2006.01)
*B23Q 9/00* (2006.01)
(Continued)

(52) U.S. Cl.
CPC .............. *B23C 3/13* (2013.01); *B23Q 9/0014* (2013.01); *B23Q 9/0028* (2013.01);
(Continued)

(58) Field of Classification Search
CPC ... B23C 1/20; B23C 2255/00–2255/12; B27C 5/10; Y10T 409/306216–306608; Y10T 409/307952; Y10T 409/308176; Y10T 409/3084; Y10T 409/308624; Y10T 409/306496; B25F 5/003; B23Q 9/0028; B23Q 9/0035
(Continued)

(56) References Cited

U.S. PATENT DOCUMENTS 900,149 A 10/1908 Danglemeyer
1,290,789 A * 1/1919 Schendel .............. B23B 49/001
409/218
(Continued)

FOREIGN PATENT DOCUMENTS

FR 1208048 A 2/1960
GB 667903 A 3/1952
KR 2008/0000476 U 4/2008

OTHER PUBLICATIONS

McMaster-Carr, Precision Positioning Slide, 15 lbs. Static Load Capacity, 1.500" Travel Length; https://mcmaster.com/5242a14, reference printed May 6, 2020.
(Continued)

*Primary Examiner* — Erica E Cadugan
(74) *Attorney, Agent, or Firm* — Baker Botts L.L.P.

(57) ABSTRACT

An apparatus for precision shaving is provided. In one embodiment, the apparatus includes an endmill cutter, a base frame, and a motor adjacent to the base frame and having a shaft on one end. A coupler is positioned between the shaft and the endmill cutter. A positioning slide is housed within the base frame and a coupler frame and a first gear are fastened to the positioning slide. A second gear is adjacent to the first gear, the second gear having a set of first teeth and a set of second teeth positioned opposite the set of first teeth. The set of first teeth and the set of second teeth are separated by a gap.

20 Claims, 3 Drawing Sheets

(51) Int. Cl.
 *B23C 3/13* (2006.01)
 *B23Q 16/02* (2006.01)

(52) U.S. Cl.
 CPC .............. *B23Q 16/024* (2013.01); *B23C 1/20* (2013.01); *B23C 2255/00* (2013.01); *Y10T 409/306496* (2015.01); *Y10T 409/306608* (2015.01); *Y10T 409/307952* (2015.01); *Y10T 409/308176* (2015.01)

(58) Field of Classification Search
 USPC .............. 409/175–182, 206, 210, 214, 218; 144/136.95, 154.5
 See application file for complete search history.

(56) References Cited

U.S. PATENT DOCUMENTS

| | | | | |
|---|---|---|---|---|
| 1,899,883 | A * | 2/1933 | Sacrey | B27C 5/10 310/91 |
| 2,342,829 | A * | 2/1944 | Armitage | B23C 1/12 409/218 |
| 2,520,868 | A * | 8/1950 | Whiting | B24B 47/20 409/210 |
| 2,588,932 | A | 3/1952 | Klingenberg | |
| 2,599,415 | A * | 6/1952 | Russell | B44D 3/162 409/180 |
| 2,625,860 | A | 1/1953 | Plester | |
| 2,988,119 | A | 6/1961 | Godfrey et al. | |
| 3,421,411 | A * | 1/1969 | Lowry | B23D 79/02 409/180 |
| 3,443,479 | A | 5/1969 | Hawley et al. | |
| 3,466,973 | A * | 9/1969 | Rees | B27C 5/10 409/182 |
| 5,368,424 | A | 11/1994 | Bettenhausen | |
| 5,533,845 | A | 7/1996 | Glover | |
| 5,947,103 | A | 9/1999 | Saccon | |
| 6,071,050 | A * | 6/2000 | Patrick | B23Q 5/32 409/206 |
| 6,619,894 | B2 | 9/2003 | Hathcock et al. | |
| 6,726,414 | B2 * | 4/2004 | Pientka | B27C 5/10 409/218 |
| 6,929,436 | B2 * | 8/2005 | Shannon | B44C 1/222 409/180 |
| 8,602,695 | B2 | 12/2013 | Bignotto et al. | |
| 2008/0210337 | A1 * | 9/2008 | Sommerville | B27C 5/10 144/286.5 |
| 2010/0089496 | A1 * | 4/2010 | Barnes | B27C 5/10 144/144.1 |
| 2019/0070675 | A1 * | 3/2019 | Dolezal | B23C 3/126 |

OTHER PUBLICATIONS

Uxcell DC 6V 2000RPM Gear Motor, Speed Reduction Motor GA12-N20 for RC Car, Robot Model, DIY Engine Toys, by uxcell; http://www.amazon.com/dp/B07RLX7D4B/ref=sspa_dk_detail_5?psc=1&pd_rd_i=B07RL . . . , reference printed May 6, 2020.

* cited by examiner

SURFACE PRECISION DEFECT SHAVER

TECHNICAL FIELD

This disclosure relates in general shaving systems for aircraft and more particularly to a surface precision defect shaver.

BACKGROUND

Precision shaving systems may be used to remove a defect from a surface. In the context of aircraft, precision shaving systems may be used to remove a defect from the exterior of an aircraft, such as the canopy over the cockpit. Traditional shaving systems are large, costly, imprecise, and ineffective with contoured surfaces.

SUMMARY OF THE DISCLOSURE

According to one embodiment, an apparatus for precision shaving is provided. The apparatus includes an endmill cutter, a base frame, and a motor adjacent to the base frame, the motor having a shaft on one end. A coupler is positioned between the shaft and the endmill cutter. A positioning slide is housed within the base frame and a coupler frame and a first gear are fastened to the positioning slide. A second gear is adjacent to the first gear, the second gear having a set of first teeth and a set of second teeth positioned opposite the set of first teeth. The set of first teeth and the set of second teeth are separated by a gap.

According to another embodiment, a method of precision shaving includes inserting an endmill cutter through a hole in a base frame; placing a motor adjacent to the base frame, the motor having a shaft on one end; and positioning a coupler between the shaft and the endmill cutter. The method also includes placing a positioning slide within the base frame; fastening a coupler frame and a first gear to the positioning slide; and placing a second gear adjacent to the first gear. The second gear has a set of first teeth and a set of second teeth positioned opposite the set of first teeth, and the set of first teeth and the set of second teeth are separated by a gap. The method further includes shaving an amount of material from a surface.

Technical advantages of certain embodiments may include the ability to remove a small, precise amount of excess material from the exterior of an aircraft. Other technical advantages will be readily apparent to one skilled in the art from the following figures, descriptions, and claims. Moreover, although specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

The teachings of the disclosure recognize that existing shaving systems are large, costly, and difficult to use. Existing tools often require expensive robotics and programming, and they are unable to hold a tight enough tolerance to remove a small amount of material, such as 0.001 inches. Traditional systems often shave too little material from a surface or too deep into the surface, rendering the surface unusable. When implemented on an aircraft, existing tools are ineffective with contoured surfaces, such as the canopy over the cockpit. Further, many existing shaving systems only work with certain types of large motors that operate at a high rate of revolutions per minute (RPM). The above problems cause existing shaving tools to be imprecise and inflexible in different applications.

The teachings of the disclosure recognize that by incorporating certain modified components in the shaving system, these above problems can be addressed. For example, a modified gear system allows the precision shaving system to cut in fine increments such as 0.00025 inches. This feature allows the minute precision necessary in certain applications. Further, the precision shaving system has a contoured frame designed to allow the system to work effectively with contoured surfaces, such as the canopy of an aircraft. The following describes systems and methods of precision shaving providing these and other desired features.

Figure 1:
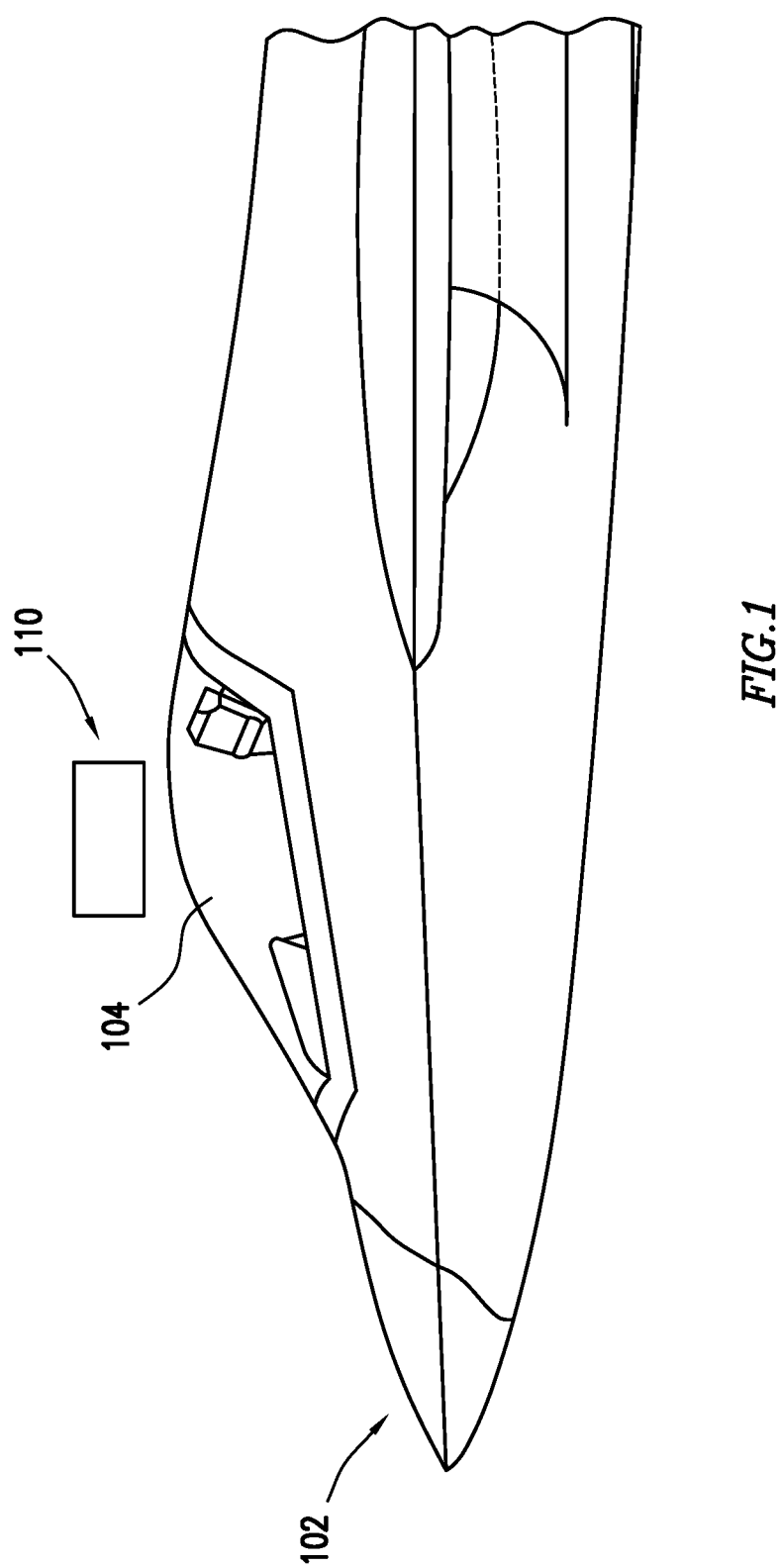
FIG. 1 is a diagram of an aircraft with a canopy that may have a defect requiring removal by precision shaving system (also illustrated), according to certain embodiments.

FIG. 1 is a diagram of an aircraft with a canopy that may have a defect requiring removal by the precision shaving system, according to certain embodiments. As shown in FIG. 1, aircraft 102 may include canopy 104—the area directly above the cockpit of aircraft 102. Precision shaving system 110 may be placed directly above canopy 104 to perform its shaving function.

Figure 2A:
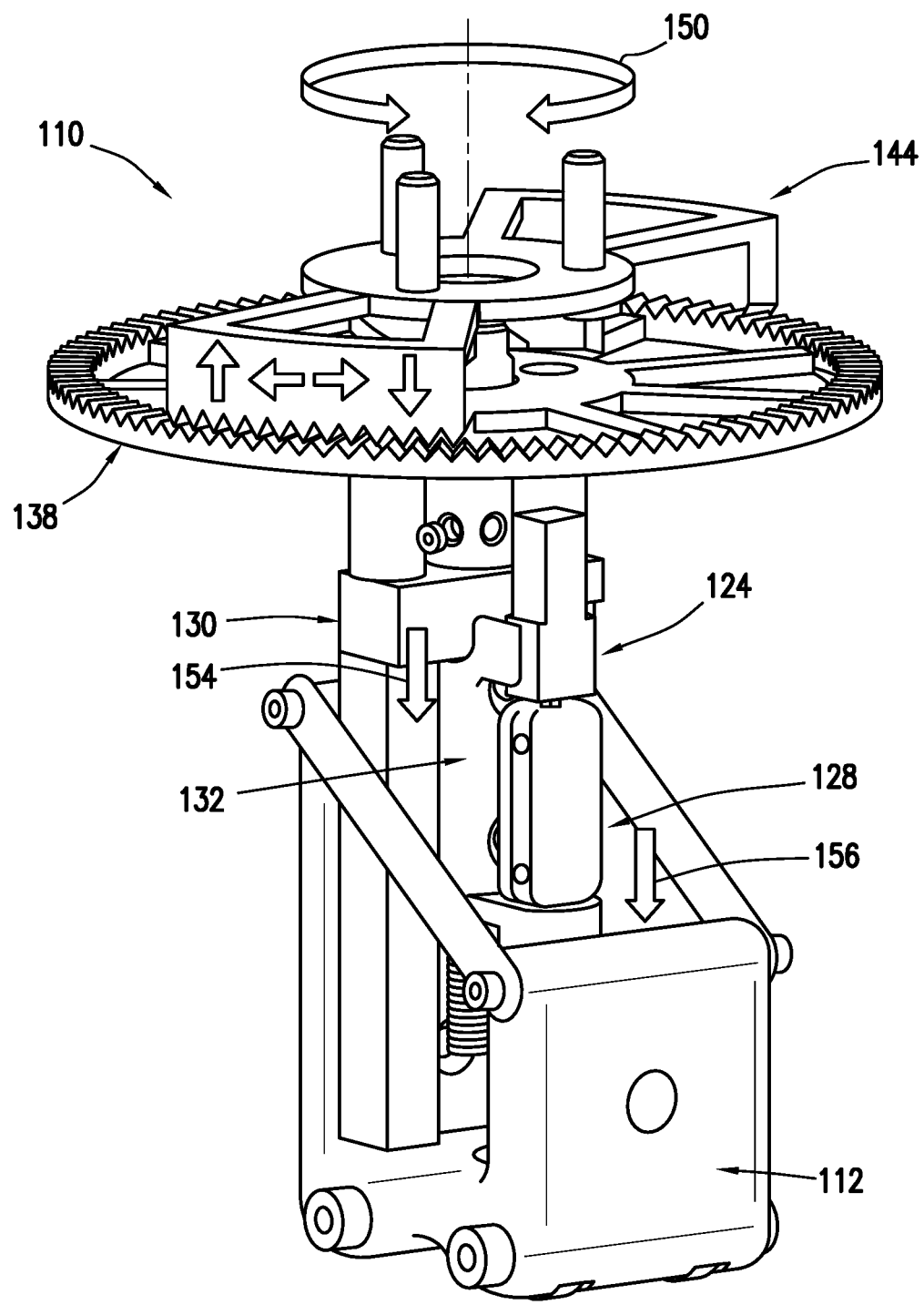
FIG. 2A is a schematic of a precision shaving system that may be used to remove a defect from the aircraft canopy of FIG. 1, according to certain embodiments.

FIG. 2A is a schematic of a precision shaving system that may be used to remove a defect from the aircraft canopy of FIG. 1, according to certain embodiments. As shown in FIG. 2A, precision shaving system 110 may comprise a base frame 112, a motor 124, a coupler 128, a positioning slide 130, a coupler frame 132, a first gear 138, and a second gear/second gear element 144. These components will be discussed in further detail with respect to FIG. 2B. Certain other components of some embodiments of precision shaving system 110 are not identified in FIG. 2A but will be discussed with respect to FIG. 2B.

Figure 2B:
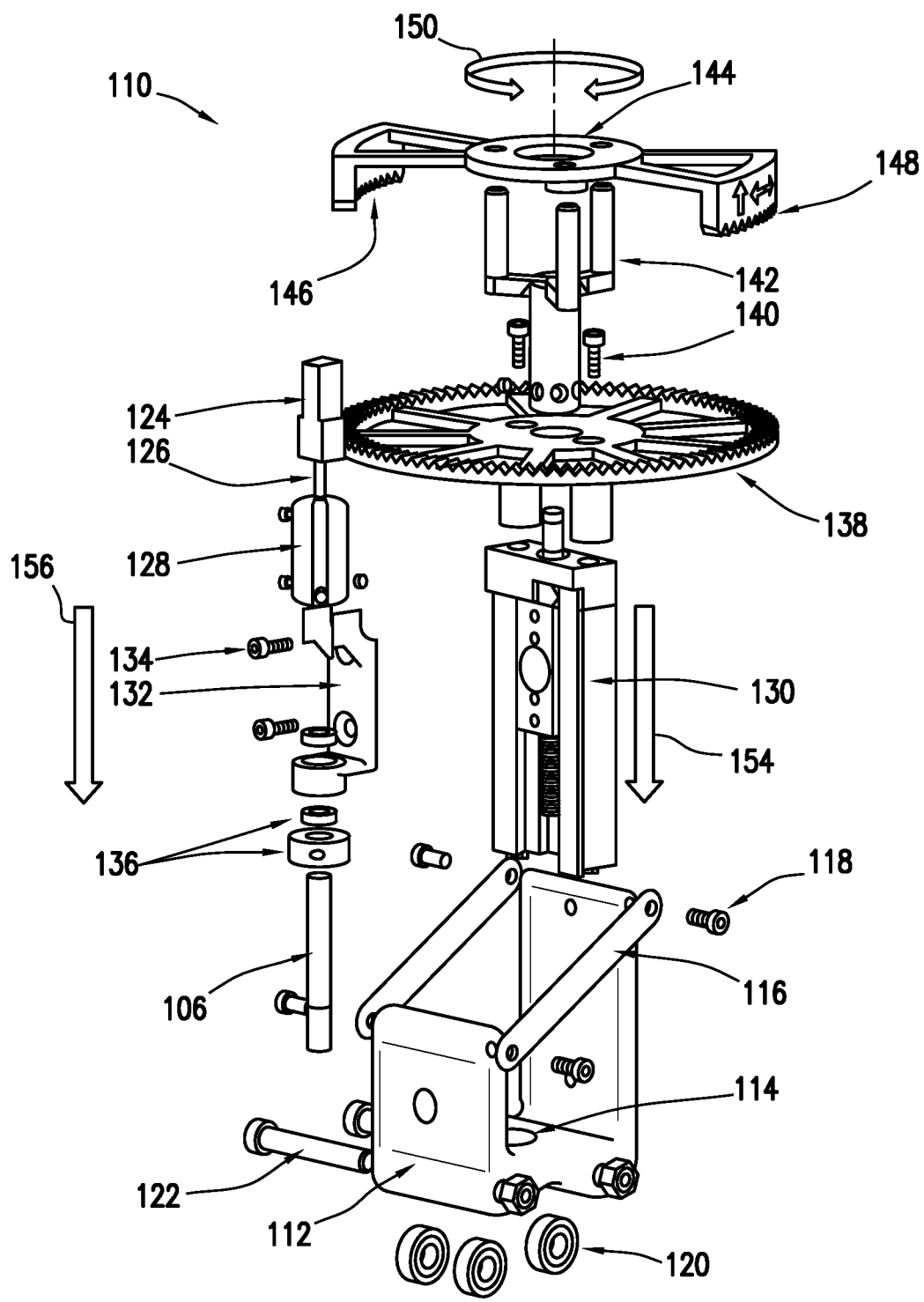
FIG. 2B is an exploded diagram of certain components of the precision shaving system of FIG. 2A, according to certain embodiments.

FIG. 2B is an exploded diagram of certain components of the precision shaving system of FIG. 2A, according to certain embodiments. As shown in FIG. 2B, precision shaving system 110 may include, in some embodiments, an endmill cutter 106, a base frame 112, a plurality of wheels 120, a motor 124, a coupler 128, a positioning slide 130, a coupler frame 132, a first gear 138, a mounting frame 142, and a second gear element 144.

In some embodiments described herein, first gear 138 has a large number of teeth, such as 100 teeth, and is placed adjacent to second gear element 144, the second gear element 144 having a disk, a first sector gear projecting from the disk, and a second sector gear projecting from an opposite side of the disk, wherein the first sector gear has a first set of teeth 146 and the second sector gear has a second set of teeth 148. Each of the first set of teeth 146 and second set of teeth 148 may comprise a smaller number of teeth as compared to first gear 138, for example, 10 teeth each, in some embodiments. Second gear element 144 may be offset by, for example, 1.8 degrees in relation to first gear 138, allowing a first set of teeth 146 to lock into place in the surface of the pitches of first gear 138. The second set of teeth 148 may then rest on top of the teeth of first gear 138. This allows, in some embodiments, the precision shaving system 110 to have 200 increments per rotation. Thus, by using the first gear 138 and second gear element 144 in conjunction with various other components of precision shaving system 110, the system may provide the ability to shave both flat and contoured surfaces in fine increments, which in this example amounts to 0.00025-inch increments, in accordance with various methods described herein. This provides, in some embodiments, several advantages, such as the ability to remove a small, precise amount of a surface defect with a system that is compact, inexpensive, and user-friendly.

Base frame 112 may serve as the base for housing certain components of precision shaving system 110. The bottom of base frame 112 may be contoured in some embodiments, such that the bottom corners of base frame 112 may rest on a contour surface such as the canopy of an airplane. The contoured bottom of base frame 112 may allow precision shaving system 110 to operate on a contoured surface having as small as a 1.250-inch radius, in certain embodiments. Base frame 112 may also have inserts for a plurality of wheels 120, which allow the precision shaving system 110 to move smoothly across a surface during operation. The plurality of wheels 120 may be fastened to base frame 112 using fasteners 122, such as bolts or screws. Further, base frame 112 may have an insert 114 for an endmill cutter 106, allowing the endmill cutter 106 to penetrate the bottom of base frame 112 and shave a surface. Support braces 116 may provide rigid support for base frame 112. Base frame 112 and support braces 116 may comprise any type of metal, such as aluminum, and support braces 116 may be secured to base frame 112 using fasteners 118, such as bolts or screws.

A series of components for providing a precision shaving function may be positioned adjacent to base frame 112, in some embodiments. These components may include, in some embodiments, endmill cutter 106, motor 124, and coupler 128. Endmill cutter 106 may be any type of milling cutter or drill bit able to provide a cutting or shaving function, and in certain embodiments, endmill cutter 106 may be 0.25 inches or more in diameter. Motor 124 may be a DC motor capable of providing sufficient power to endmill cutter 106. Motor 124 may, in certain embodiments, have a shaft 126 which rotates and drives endmill cutter 106 via coupler 128. Motor 124 may be a DC 6V, 2000 RPM gear motor, available from various vendors. See https://www.amazon.com/dp/B07RLX7D4B/ref=sspa_dk_detail_5?psc=1&pd_rd_i=B07RLX7D4B&pd_rd_w=7R3LH&pf_rd_p=48d372cl-f7el-4b8b-9d02-4bd86f5158c5&pd_rd_wg=rwhlB&pf_rd_r=Y9S9G78YQRRXECBA8AW3&pd_rd_r=46a61f8e-88b6-4d06-83d2-22f0b3724841&spLa=ZW5jcnlwdGVkUXVhbGlmaWVyPUEVkJWMktOTUJPVzVHJmVuY3J5cHRlZElkPUEwMjOxMTYxVDAwTklNTktZQVNEJmVuY3J5cHRlZEFkSWQ9QTAwMTAxNDQvNFdWOTRPR0Y5M0RXJndpZGdldE5hbWU9c3BfZGV0YWlsJmFjdGlvbj1jbGlja1JlZGlyZWN0JmRvTm90TG9nQ2xpY2s9dHJlZQ==. Motor 124 may operate at between 500 and 3000 RPM, in certain embodiments. A battery for providing power to motor 124 may be attached to a side of base frame 112.

Coupler 128 may, in some embodiments, facilitate the transfer of power from the shaft 126 of motor 124 to the endmill cutter 106. Shaft 126 may attach directly to coupler 128 and may rotate along with shaft 126. Shaft 126 may be secured to coupler 128 using one or more set screws. Coupler 128 may also attach directly to endmill cutter 106, and a plurality of bearings 136 may be used to allow the endmill cutter 106 to rotate freely when surrounded by other components, such as coupler frame 132. Bearings 136 may be secured in place using one or more set screws.

Positioning slide 130 may be housed within the base frame 112, in some embodiments. Positioning slide 130 may, in certain embodiments, contain a drive shaft and a slide to facilitate the raising and lowering of endmill cutter 106 with respect to a surface. Positioning slide 130 may comprise aluminum and may be obtained from various vendors. See https://www.mcmaster.com/5242a14. The factory hand wheel allowing for manual operation of positioning slide 130 has been removed from the precision shaving system 110, in some embodiments. Coupler frame 132 may be used to secure the motor 124, coupler 128, and endmill cutter 106 to the positioning slide 130. Coupler frame 132 may be secured to positioning slide 130 using a plurality of fasteners 134, such as bolts or screws.

The position of the slide of positioning slide 130 may, in some embodiments, be controlled using a plurality of gears, such as a first gear 138 and a second gear element 144. First gear 138 may comprise a plurality of teeth, and in some embodiments may comprise between 90 and 110 teeth. The second gear element 144 may be positioned adjacent first gear 138, in certain embodiments. The teeth of first gear 138 and second gear element 144 may be facing in opposite directions, such that they may be able to mesh with each other during operation of precision shaving system 110. Second gear element 144 may comprise a first set of teeth 146 and a second set of teeth 148 positioned opposite the set of first teeth 146. The sets of teeth of second gear element 144 may be separated by a gap. The first set of teeth 146 and the second set of teeth 148 each have between 5 and 15 teeth, in some embodiments. The number of teeth of first gear 138 and second gear element 144 may also comprise any number of teeth such that the number of teeth of first gear 138 is large relative to the number of teeth of second gear element 144, in some embodiments. The first gear and second gear element may comprise any material, and in some embodiments comprise aluminum. First gear 138 may be fastened to positioning slide 130 using a plurality of fasteners 140, such as screws or bolts. First gear 138 may be fixed onto positioning slide 130, in some embodiments, such that first gear 138 does not move or rotate. A mounting frame 142 is attached directly to the drive shaft of positioning slide 130 using a plurality of set screws, in some embodiments. Mounting frame 142 may further comprise one or more handles. Second gear element 144 may have a plurality of holes, allowing second gear element 144 to be secured by the one or more handles of mounting frame 142. Application of a force to the one or more handles of mounting frame 142 may enable mounting frame 142 and second gear element 144 to rotate, changing the position of the slide of positioning slide 130 and the endmill cutter 106.

First gear 138 comprises 100 teeth, and the first set of teeth 146 and second set of teeth 148 of second gear element 144 each comprise 10 teeth, in some embodiments. The first set of teeth 146 or the second set of teeth may be offset by 1.8 degrees or more in relation to the teeth of first gear 138, while the other set of teeth is offset by zero degrees in relation to the teeth of first gear 138. This configuration may allow, in some embodiments, one set of teeth of second gear element 144 to lock into place in the surface of the pitches of first gear 138, while the other set of teeth rest on top of the teeth of first gear 138. Accordingly, the precision shaving system 110 may achieve 200 cutting increments per rotation, each increment representing 0.00025 inches. A full rotation of second gear element 144 may cause the slide of positioning slide 130 and the endmill cutter 106 to move by 0.050 inches. A full rotation of the second gear element 144 may cause the endmill cutter 106 to move between 0.045 and 0.055 inches.

In operation, precision shaving system 110 may be used for removing a surface defect on an aircraft using various techniques described herein. With reference to FIGS. 2A and 2B, at step 150, a user may apply a force to the one or more handles of mounting frame 142. The rotation of mounting frame 142 may cause the second gear element 144 to rotate. At step 154, the rotation of mounting frame 142 and second gear element 144 may cause the slide of positioning slide 130 to lower. Positioning slide 130 may be attached to the coupler frame 132, and the coupler frame 132 may be attached to motor 124, coupler 128, and endmill cutter 106. At step 156, the lowering of the slide of positioning slide 130 and coupler frame 132 may cause the endmill cutter 106 to lower with respect to a target surface.

In one example, the endmill cutter 106 of precision shaving system 110 may be placed 0.001 inches above the target surface, and a user may turn the one or more handles of mounting frame 142 (shown at step 150), making one increment step with second gear element 144 while the motor 124 is operating and causing endmill cutter 106 to rotate. Then, the user may decrease the distance of endmill cutter 106 in relation to the target surface by 0.00025 inches (shown at step 156), and again turn the one or more handles of mounting frame 142 (shown at step 150) to make an increment step with second gear element 144 while the motor 124 is operating and causing endmill cutter 106 to rotate. This process may then be repeated until the desired shave of the target surface is achieved.

A number of implementations have been described. Nevertheless, it will be understood that various modifications may be made without departing from the spirit and scope of the invention. Elements of different implementations described herein may be combined to form other implementations not specifically set forth above. Elements may be left out of the processes, structures, and systems described herein without adversely affecting their operation. Furthermore, various separate elements may be combined into one or more individual elements to perform the functions described herein. Although certain example embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for precision shaving, comprising:
   an endmill cutter;
   a base frame having an insert for the endmill cutter and having a plurality of wheels;
   a motor adjacent to the base frame and having a shaft on one end;
   a coupler positioned between the shaft and the endmill cutter;
   a positioning slide housed within the base frame;
   a coupler frame fastened to the positioning slide;
   a first gear fastened to the positioning slide;
   a second gear element adjacent to and engageable with the first gear, the second gear element comprising a disk, a first sector gear, and a second sector gear, the first sector gear projecting from one side of the disk and having a set of first teeth, the second sector gear projecting from an opposite side of the disk and having a set of second teeth positioned opposite the set of first teeth, the set of first teeth and the set of second teeth being separated by a gap; and
   one or more handles protruding from the second gear element.

2. The apparatus of claim 1, further comprising a mounting frame positioned between the first gear and the second gear element, wherein the one or more handles protruding from the second gear element are part of the mounting frame.

3. The apparatus of claim 2, wherein the first gear has between 90 and 110 teeth.

4. The apparatus of claim 3, wherein the first and second set of teeth of the second gear element each have between 5 and 15 teeth.

5. The apparatus of claim 4, wherein the first set of teeth of the second gear element is offset by 1.8 degrees or more in relation to the first gear.

6. The apparatus of claim 4, wherein each full rotation of the second gear element causes the endmill cutter to move by between 0.045 and 0.055 inches.

7. An apparatus for precision shaving, comprising:
   an endmill cutter;
   a base frame;
   a motor adjacent to the base frame and having a shaft on one end;
   a coupler positioned between the shaft and the endmill cutter;
   a positioning slide housed within the base frame;
   a coupler frame fastened to the positioning slide;
   a first gear fastened to the positioning slide; and
   a second gear element adjacent to and engageable with the first gear, the second gear element comprising a disk, a first sector gear, and a second sector gear, the first sector gear projecting from one side of the disk and having a set of first teeth, the second sector gear projecting from an opposite side of the disk and having a set of second teeth positioned opposite the set of first teeth, the set of first teeth and the set of second teeth being separated by a gap.

8. The apparatus of claim 7, further comprising a plurality of wheels fastened to the base frame.

9. The apparatus of claim 7, further comprising one or more handles protruding from the second gear element.

10. The apparatus of claim 9, further comprising a mounting frame positioned between the first gear and the second gear element, wherein the one or more handles protruding from the second gear element are part of the mounting frame.

11. The apparatus of claim 10, wherein the first gear has between 90 and 110 teeth.

12. The apparatus of claim 11, wherein the sets of first and second teeth of the second gear element each have between 5 and 15 teeth.

13. The apparatus of claim 11, wherein each full rotation of the second gear element causes the endmill cutter to move between 0.045 and 0.055 inches.

14. The apparatus of claim 13, wherein the shaft of the motor makes between 500 and 3000 revolutions per minute.

15. The apparatus of claim 14, wherein the endmill cutter is 0.25 inches or more in diameter.

16. An apparatus for precision shaving, comprising:
an endmill cutter;
a base frame;
a motor adjacent to the base frame and having a shaft on one end;
a coupler positioned between the shaft and the endmill cutter;
a positioning slide housed within the base frame;
a coupler frame fastened to the positioning slide;
a first gear fastened to the positioning slide;
a second gear element adjacent to and engageable with the first gear, the second gear element having a set of first teeth and a set of second teeth positioned opposite the set of first teeth, the set of first teeth and the set of second teeth being separated by a gap,
one or more handles protruding from the second gear element; and
a mounting frame positioned between the first gear and the second gear element, wherein the one or more handles protruding from the second gear element are part of the mounting frame.

17. The apparatus of claim 16, further comprising a plurality of wheels fastened to the base frame.

18. The apparatus of claim 16, wherein the first gear has between 90 and 110 teeth.

19. The apparatus of claim 16, wherein the sets of first and second teeth of the second gear element each have between 5 and 15 teeth.

20. The apparatus of claim 16, wherein each full rotation of the second gear element causes the endmill cutter to move between 0.045 and 0.055 inches.

* * * * *